(No Model.)

J. H. WHITAKER.
HARNESS.

No. 496,028. Patented Apr. 25, 1893.

WITNESSES:
L. G. Susemihl
T. A. Murphy

INVENTOR:
John H. Whitaker,
Per Wm. K. White
Attorney.

UNITED STATES PATENT OFFICE.

JOHN H. WHITAKER, OF DAVENPORT, IOWA.

HARNESS.

SPECIFICATION forming part of Letters Patent No. 496,028, dated April 25, 1893.

Application filed May 31, 1892. Serial No. 434,977. (No model.)

*To all whom it may concern:*

Be it known that I, JOHN H. WHITAKER, a citizen of the United States, residing at Davenport, in the county of Scott and State of Iowa, have invented a new and useful Improvement in Horse-Training Devices, of which the following is a specification.

My invention relates to improvements in a device for controlling the action of the limbs of a horse and constitutes an improvement of the device for which I was granted Letters Patent of the United States, January 6, 1891, No. 444,032, and my improvement consists in the interposition of a rigid piece between the front and hind limbs of the animal, and the object of my improvement is to compel simultaneous movement of such front and hind limbs. I attain this object by the mechanism illustrated in the accompanying drawings, in which—

Figure 1:
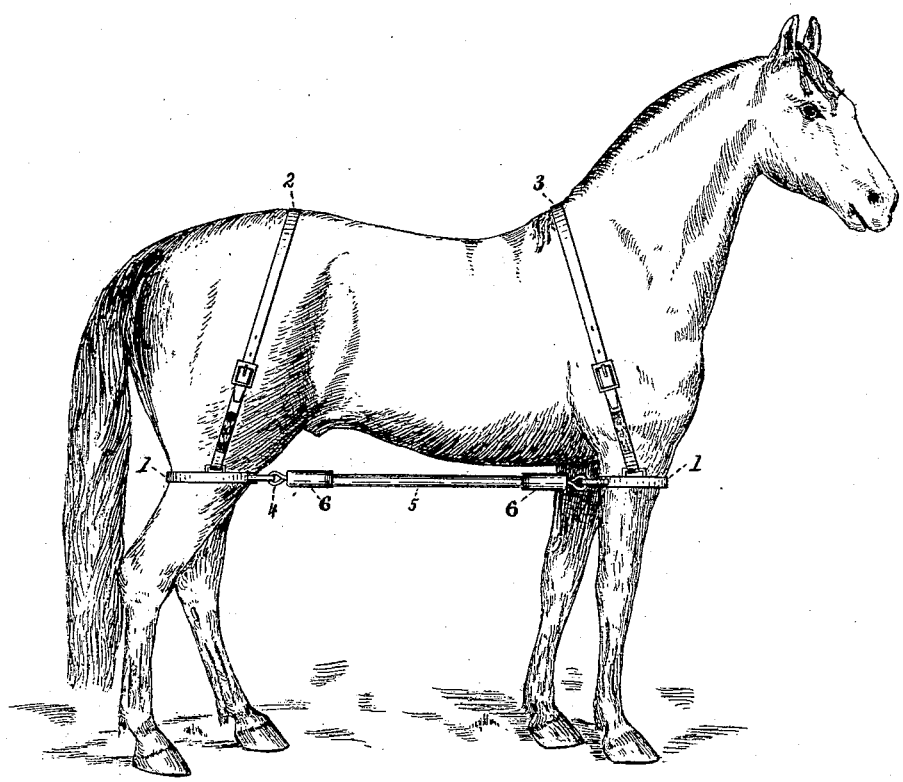
Figure 2:
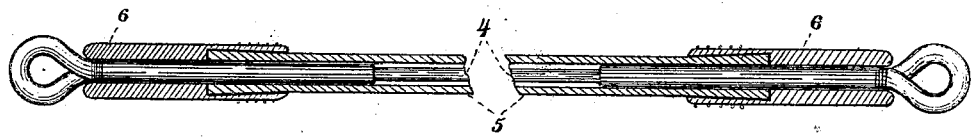

Figure 1 shows my device as it appears upon the animal, and Fig. 2 shows an enlarged longitudinal section of the tube, broken through the center, and showing the strap within such tube.

Similar numerals of reference refer to similar parts throughout the several views.

1 represents limb straps, which are placed around each limb of the animal near the body. 2 and 3 are body straps which are respectively passed over the haunches and withers of the animal, the ends of such body straps being secured to a limb strap for supporting and retaining the same upon the animal's limbs.

4 are straps interposed between the front and hind limbs of the animal, the ends of which are secured to a limb strap. The straps 4 and body straps may have elastic material incorporated therein if desired. The tubes 5 are constructed of several layers of paper or pasteboard, or other light material, capable of being made unyielding and strong, and the ends of such tubes are provided with cushions 6, of rubber or other elastic material. A strap 4 is passed through the orifice in the tube 5 so that the ends extend beyond the cushions 6, such ends being attached to a limb strap as shown in Fig. 1.

In carrying out my improvement, I prefer to use as such rigid piece, said tube consisting of several layers of paper or paste board, sufficient to make the tube unyielding and strong, and at the same time, light, adapting such tube to receive a strap connecting the limb straps, which are described and shown in my former Letters Patent, thus interposing such tube between the limb straps or front and hind limbs of the animal. The piece or tube may be constructed of other material, but it is preferable that material should be used which is light and yet possesses strength, and which will not splinter if broken, and thus render the animal liable to injury by splints or sharp edges, where broken. I prefer such piece to be in the form of a tube, yet a rod or bar may be used. I also prefer to surround the ends of the tube, rod, or bar with rubber or other elastic substance to act as a cushion, so that no injury may occur to the animal's limbs by coming in contact with an end of the tube, rod, or bar.

The arrangement of the tubes or pieces on the animal will be the same as described for the straps in said Letters Patent referred to, that is, if the animal is tought to trot, the pieces or tubes are crossed beneath the belly of the animal, so that one tube or piece will be connected with the right-hand-hind limb and the left-hand front limb, and the other tube or piece will be connected with the left-hand hind limb and the right-hand front limb. If the animal is to be taught to pace, one tube or piece will be connected with the right-hand hind limb and right-hand front limb and the other tube or piece will be connected with the left-hand hind-limb and the left hand front limb. These tubes or pieces compel simultaneous movement of the front and hind limbs of the animal to which they are connected and yet permit elasticity to the straps connected with the limb straps.

In the Letters Patent granted to me, and to which I have already referred, my invention consisted of attaching straps having elastic material incorporated therewith, to limb straps, between the front and hind limbs of the animal, and supporting such limb straps by body straps and I am also aware that in Letters Patent granted Reese, March 8, 1864, No. 41,860, he describes a wire harness which consists in the use of iron wire or cord which is cut into the necessary lengths for the different parts of the bridle and harness, the ends of which are provided with loops for connecting the parts together where necessary.

Persons skilled in the art, will readily understand the construction of my device and its mode of operation.

What I claim as new, and desire to secure by Letters Patent, is—

1. In a horse training harness the combination of the limb straps, the body straps supporting the limb straps, the rigid tubes, and the straps 4, inclosed in said tubes for the purpose set forth and substantially as described.

2. In a horse training harness the combination of the limb straps, the body straps supporting the limb straps, the rigid tubes, the elastic cushions attached to the ends of said tubes, and the straps 4, inclosed in said tubes for the purpose set forth and substantially as described.

JOHN H. WHITAKER.

Witnesses:
T. A. MURPHY,
L. G. SUSEMIHL.